United States Patent Office 2,947,073
Patented Aug. 2, 1960

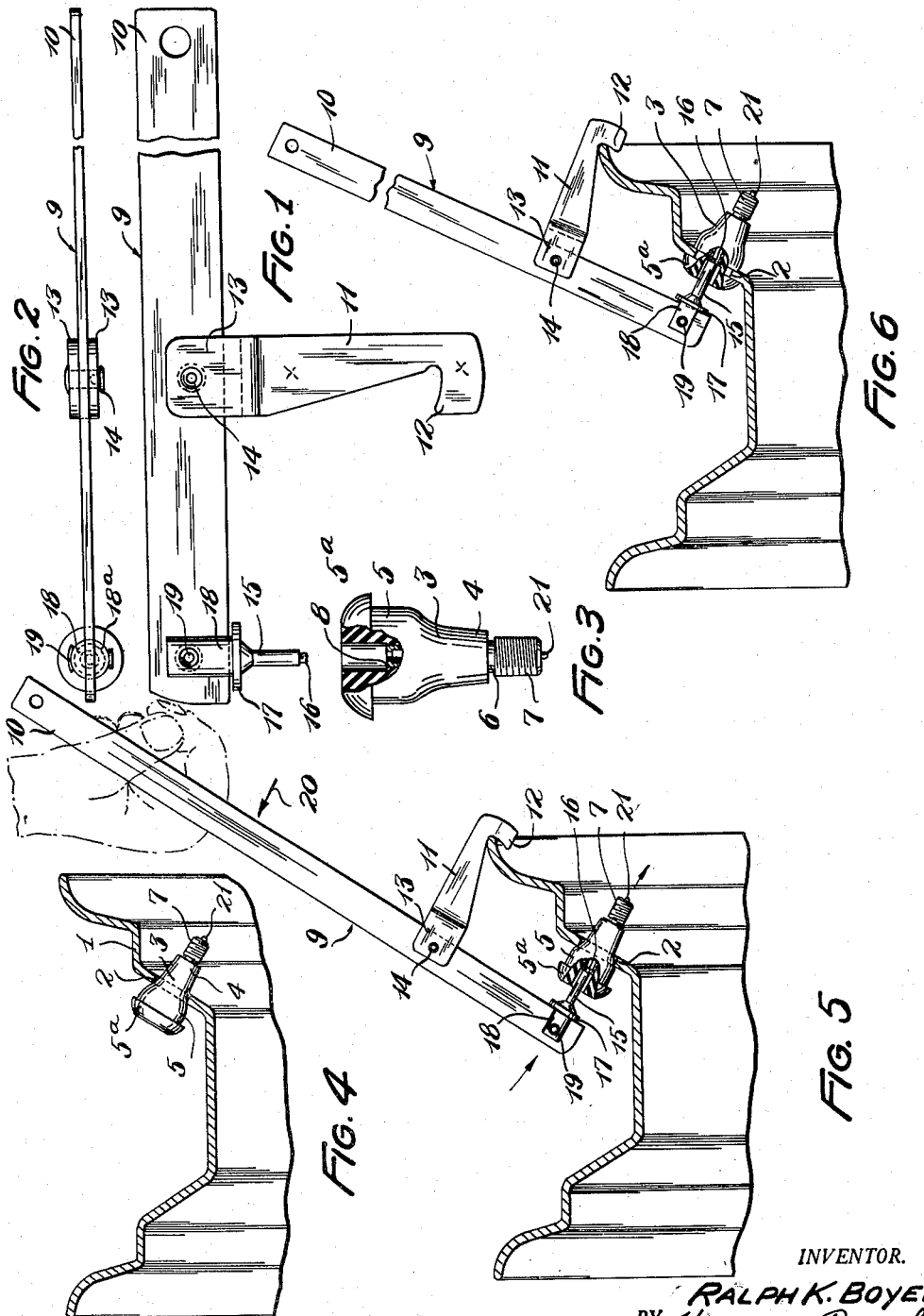

2,947,073
TIRE VALVE TOOL

Ralph K. Boyer, Cleveland, Ohio, assignor to The Dill Manufacturing Company, Cleveland, Ohio, a corporation of Ohio Filed Feb. 14, 1955, Ser. No. 487,861

2 Claims. (Cl. 29—267)

The present invention relates to a tool which is intended for use in connection with the assembly of a rubber valve stem of the type used upon the rim for a tubeless tire.

At the present time there are in use rubber valve stems so constructed that they may be forced from the inside through the valve stem opening provided in the rim upon which the tubeless tire is to be mounted. Such rubber valve stems when forced into and partially through the valve stem opening in the rim, are retained in their position with respect to the rim by virtue of the binding action of the rubber stem upon the peripheral portion of the valve stem opening and the portion of the rim adjacent the valve stem opening and so afford not only a seal against the escape of air but also afford a mechanical anchorage upon the rim.

Rubber valve stems of the character and kind that are thus used, usually provide a rubber body which has an enlarged portion of greater diameter than the diameter of the valve stem opening in the rim and also provide a head which is of greater diameter than the valve stem opening and adapted to engage the inner surface of the rim when the valve stem has been forced into final position with respect to the opening in the rim. In order for such valve stems to be inserted it is necessary that a force shall be applied to the valve stem such that the enlarged diameter portion of the stem shall be stretched during the operation of forcing the stem into its final position with respect to the valve stem opening in the rim and the present invention is directed particularly toward a tool which may be easily and quickly applied in connection with the operation of inserting such a rubber stem with respect to the valve stem opening in the rim.

Referring to the drawings which are made a part of the present application,

Fig. 1 is a side elevation of the tool, the same being shown broken apart to indicate that a portion of the tool is of greater length than that shown;

Fig. 2 is a top plan view of the tool as shown in Fig. 1;

Fig. 3 is an elevation with portions in section of a rubber valve stem of the character and kind such as is used in connection with tubeless tire rims;

Fig. 4 is a view showing a rim in section with a valve stem of the character shown in Fig. 3 as it is initially applied by hand to the valve stem opening in the rim;

Fig. 5 shows a rim in section, also a valve stem with portions in section and the tool as it is initially applied in inserting such a stem into the valve stem opening of the rim; and, Fig. 6 shows in section a rim with the valve stem in its final position with respect to the opening in the rim and the position of the tool when such final insertion is attained.

Referring to the drawings, more particularly 1, represents a rim adapted to mount a tubeless tire which rim is provided with a valve stem opening 2 the foregoing being commonly known in the art.

In Fig. 3 there is shown a type of rubber stem adapted to be used in connection with such a rim as indicated at 1 and having a valve stem opening such as indicated at 2. The valve stem comprises a rubber body 3 having a portion of smaller diameter than a rim valve stem opening, as indicated at 4, and also an enlarged portion, as indicated at 5, which is of a diameter greater than the diameter of the valve stem opening in the rim. The body of this valve stem is made of rubber and extending longitudinally through the rubber body is a hollow metal insert 6 which has a threaded exterior portion 7, the insert extending through the body of the stem but terminating short of the inner end of the stem, the inner end of such insert being indicated at 8. The exact position of the insert with respect to the inner end portion of the valve stem may vary and there is no intention, in connection with the description which has preceded, to place any particular limitation as to the length of the insert with respect to the rubber body which comprises the stem.

The tool which forms the subject matter of the present invention comprises a unitary body which is indicated at 9, having what may be termed a handle portion 10. Adjacent one end of the member 9 there is pivotally mounted a hook member 11, this hook member having an end portion 12 which has a reentrant recess. The member 11 may be variously formed but in the present instance is shown as comprising two parallel arranged members 13 which are spot-welded to form a unitary structure but at their upper ends the members of the hook 11 are spaced so that they straddle the member 9 and are pivoted upon the member 9, as indicated at 14. The pivoting arrangement is such that the spread portions between the upper parts of the hook member 11 afford a spaced relation beneath the member 9 so that the hook member 11 has a certain amount of swinging action with respect to the member 9.

At an end of the member 9 there is provided a thrust member such as a pin 15 which has a reduced extension 16 at the end thereof. This pin is provided with a collar portion 17 which is spaced somewhat with respect to the lower portion of the member 9. The upper portion of the member which has just been described, is slotted so that it can straddle the member 9 providing the two split portions 18 and 18a. A pin 19 extends through the portions 17 and 18 and through a hole in the member 9 so that the structure referred to, as the pin 15, has a swing mounting providing limited swinging movement of the pin with respect to the end of the member 9.

The use of the tool may be described as follows: in the first instance the rubber valve 5 is inserted into the valve stem opening in the rim until the thickened body portion engages with the periphery of the valve stem opening, as is indicated in Fig. 4. Then the tool is applied by inserting the pin 15 therein so that the extension 16 engages with the end 8 of the insert 6 which, as before described, is molded within the rubber portion of the valve stem and it is adhesively joined to such rubber so that it becomes in essence a part of the structure.

The hook 11, and more particularly the part 12 thereof, is caused to engage with the outer flange portion of the rim. Then mechanical force applied in the direction of the arrow 20 is exerted essentially at the outer end of the member 9 and such application of force is enhanced by the length of the lever arm of the member 9 beyond the pivot 14 which, under the circumstances becomes a fulcrum point and the force to the short arm of the lever is applied, as a thrust action, directly against the end 8 of the insert 6. This has the effect of stretching the rubber of the rubber stem so that the thicker portion 5 of the rubber stem is stretched in the direction of the axis of the stem and pushes through the valve stem opening 2 so that the thickened portion of the valve stem becomes located within the periphery of the opening 2 and the head 5a is essentially in contact with the inner portion of the rim. Upon the release of force which, as before described, has been applied at the free end of the member 9, the rubber body expands within the periphery of the opening 2 and overlies the surface of the rim adjacent the valve stem opening.

What has just been described is the final positioning of the rubber stem and the expansive force of the rubber released from its stretched condition frictionally binds within the opening 2 and holds the stem in anchored position with respect to the rim.

All such valve stems as have been hereinbefore described utilize a valve insides or valve core, the valve pin of which is indicated at 21 in Fig. 3. Such valve insides, or valve cores, are well-known in the art and need no description; their function is to control the admission or release of air through the valve stem.

The description of the tool as herein given, states the best embodiment of the invention which is at present known, but obviously variations may be made in the precise construction without departing from the spirit of the invention as the same is expressed in the appended claims.

Having thus described my invention, I claim:

1. A tool for mounting a rubber valve stem in an opening therefor in a metal wheel rim adapted to have a tubeless tire mounted thereon, and the rubber valve stem being of the type having a metal insert extending longitudinally thereof with an inner end of the metal insert adapted to communicate with the inside of the tubeless tire, comprising an elongated bar one end of which provides a handle portion, a structure including a pin portion located closely adjacent to the other end of said bar and adapted to axially engage the inner end of the metal insert extending longitudinally of the rubber valve stem for enabling the application of axial thrust thereto, means permanently pivotally connecting said structure to said bar so the pin portion thereof projects laterally from one side of said bar, said structure being provided with means limiting the pivotal movement of the structure relative to said bar, and a hook member pivotally connected to said bar intermediate said one end thereof and said structure and in substantial spaced relationship longitudinally of the bar to said structure and projecting laterally from said one side of the bar in the same direction as said pin portion of said structure and a substantial distance greater than said pin portion, said structure further including a portion engaging said bar and through which extends the means for permanently pivotally connecting said structure to said bar, said structure also including a flange portion located outwardly of the said one side of said bar and constituting the means for limiting the pivotal movement of said structure relative to said bar, while said pin portion of said structure is located outwardly of said flange portion thereof.

2. A tool as defined in claim 1 and wherein said hook member has a planar portion at one end overlying said bar and through which extends means for pivotally connecting the hook member to said bar, the opposite end of said member being provided with a hook portion.

References Cited in the file of this patent
UNITED STATES PATENTS

| Number | Name | Date |
|---|---|---|
| 204,913 | Pratt | June 18, 1878 |
| 1,286,449 | Timmerman | Dec. 3, 1918 |
| 1,345,651 | Wilgus | July 6, 1920 |
| 1,356,978 | Graves | Oct. 26, 1920 |
| 1,372,389 | Bailey et al. | Mar. 22, 1921 |
| 1,587,777 | Juelfs | June 8, 1926 |
| 1,644,070 | Martin | Oct. 4, 1927 |
| 1,737,084 | Hilstad | Nov. 26, 1929 |
| 2,095,931 | Kraft | Oct. 12, 1937 |